(12) United States Patent
Xin et al.

(10) Patent No.: US 8,865,795 B1
(45) Date of Patent: Oct. 21, 2014

(54) COPIER/PRINTER EXTERIOR PART USING HALOGEN-FREE FLAME-RETARDANT RESIN COMPOSITION INCLUDING RECYCLED POLYCARBONATE AND RECYCLED POLYETHYLENE TEREPHTHALATE

(71) Applicants: Minqi Xin, Shanghai (CN); Minghua Luo, Shanghai (CN); Wenqiang Li, Shanghai (CN); Lei Gao, Shanghai (CN); Qiang Li, Shanghai (CN); Ryuji Kitani, Tokyo (JP); Yasuharu Saita, Tokyo (JP)

(72) Inventors: Minqi Xin, Shanghai (CN); Minghua Luo, Shanghai (CN); Wenqiang Li, Shanghai (CN); Lei Gao, Shanghai (CN); Qiang Li, Shanghai (CN); Ryuji Kitani, Tokyo (JP); Yasuharu Saita, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 14/302,633

(22) Filed: Jun. 12, 2014

Related U.S. Application Data (63) Continuation of application No. 13/743,934, filed on Jan. 17, 2013.

(30) Foreign Application Priority Data

Jan. 18, 2012 (CN) .......................... 2012 1 0016861

(51) Int. Cl.
C08K 5/521 (2006.01)
C08L 69/00 (2006.01)
C08L 67/02 (2006.01)

(52) U.S. Cl.
USPC ........... 523/201; 523/437; 524/147; 524/151; 524/153

(58) Field of Classification Search
CPC ...... C08K 5/0066; C08K 5/521; C08K 5/526; C08L 69/00; C08L 67/02; C08L 37/00; C08L 2205/035; C08L 2201/02
USPC ................... 523/201, 437; 524/147, 151, 153
See application file for complete search history.

(56) References Cited

U.S. PATENT DOCUMENTS 6,914,090 B2 * 7/2005 Seidel et al. .................. 524/127
2009/0012217 A1 * 1/2009 Jung et al. ..................... 524/147

FOREIGN PATENT DOCUMENTS

CN 102604351 A * 7/2012

* cited by examiner

Primary Examiner — Vickey Nerangis
(74) Attorney, Agent, or Firm — Lucas & Mercanti, LLP (57) ABSTRACT

A copier/printer exterior part uses a halogen-free flame-retardant resin composition. The halogen-free flame-retardant resin composition includes 5 wt % to 50 wt % of unused polycarbonate, 20 wt % to 63 wt % of recycled polycarbonate, 5 wt % to 35 wt % of recycled polyethylene terephthalate, 0.2 wt % to 2 wt % of a styrene-acrylonitrile-glycidyl methacrylate terpolymer, 5 wt % to 15 wt % of a toughener, 10 wt % to 20 wt % of a flame retardant, 0.1 wt % to 0.8 wt % of a flame-retardant antidrip agent, 0.1 wt % to 1 wt % of an antioxidant, and 0.1 wt % to 2 wt % of a lubricant. The styrene-acrylonitrile-glycidyl methacrylate terpolymer includes 1 wt % to 5 wt % of glycidyl methacrylate and 20 wt % to 33 wt % of acrylonitrile.

16 Claims, 2 Drawing Sheets

COPIER/PRINTER EXTERIOR PART USING HALOGEN-FREE FLAME-RETARDANT RESIN COMPOSITION INCLUDING RECYCLED POLYCARBONATE AND RECYCLED POLYETHYLENE TEREPHTHALATE

This is a Continuation of U.S. application Ser. No 13/743,934 filed Jan. 17, 2013, which claimed the priority of Chinese Application No. 201210016861.X filed Jan. 18, 2012, the priority of both applications is claimed and both applications are incorporated herein by reference.

BACKGROUND OF THE INVENTION

1. Field of the Invention

The present invention relates to a composition and use of the composition, and, in particular, relates to a halogen-free flame-retardant resin composition including recycled polycarbonate and recycled polyethylene terephthalate and a copier/printer exterior part using the resin composition.

2. Description of the Related Art

With continuous and rapid development of the plastic industry, plastic products have been widely used. At the same time, however, plastic waste has increased, and a huge amount of energy sources has been wasted. Accordingly, collection and reuse of plastic waste has attracted more attention than before.

Plastic materials are chemicals derived from petroleum. It is well known that petroleum is a lifeline for the industries of the present age and a natural source which cannot be reproduced. According to statics of a related organization, plastic waste generated by one medium-sized city per year can cover plastic materials demanded by 20 small and medium-sized plastics companies per year. Hence, reuse of plastics can be regarded as reuse of petroleum. By melting and granulating plastic waste, supply-demand imbalance in plastic materials can be reduced, and a national budget for petroleum import can be drastically cut.

Polycarbonate (PC) has excellent impact resistance, heat resistance, dimensional stability, electric insulation and the like, is nontoxic, and has low water absorbency. Accordingly, PC can be used in a wide range of temperatures. In addition, because PC has high light transmittance of 90%, it is named "transparent metal", and used instead of copper or other colored metals in various fields, such as the electrical and electronic industry, the automobile industry, the mechanical industry, the optical industry, and the pharmaceutical industry. In recent years, consumption of PC has rapidly and continuously increased, and unavoidably, a large amount of PC waste has been generated. PC waste is an important recycled source, and it is necessary to properly process PC waste so as to reduce influence of PC waste on environments. Collection and reuse of PC waste contribute to economic and social benefits significantly. Examples of PC waste to be collected include PC used in buckets, dies, and optical disks.

According to data by PCi (PET Packaging, Resin & Recycling Ltd), in 2008, production capacity of polyethylene terephthalate (PET) in the world reached 67 million tons, and output thereof was 61 million tons. Meanwhile, several million tons of PET waste, which is generated by consumption of a large amount of PET, is generated every years. If PET waste is not sufficiently used, a large amount of resources is wasted. Nowadays, recycled PET is mainly used in fibers, sheets, and bottles for containing nonfood, and used in some plastic bottles, monofilaments, and the like. However, the application range of recycled PET is relatively narrow in the engineering plastic field. In particular, application thereof in the plastic alloy field is hardly reported.

In U.S. Pat. No. 7,462,649, there is disclosed decomposing a PET bottle or the like, and performing repolymerization by ester interchange, so as to realize production of a bottle from a bottle.

Furthermore, in Chinese Patent Application Laid Open Publication No. 101338070, there is disclosed preparing a composition containing flame-retardant PC and a polyester resin, which are denaturalized by an epoxy group-containing rubber modified aromatic vinyl copolymer resin, but not disclosed using a recycled material.

Engineering PET has low viscosity/toughness in general, and recycled PET has lower viscosity/toughness. Hence, unless the viscosity/toughness is increased, the application range of recycled PET is not widened. Furthermore, influence of low molecular weights and wide distribution of molecular weights of recycled PET on performance thereof is more than that of recycled PC on performance thereof, and hence a composition including recycled PET and a product using the composition are unstable in performance, and difficult to obtain stable mechanical performance. Consequently, the application range of recycled PET is somewhat limited.

Therefore, development of a halogen-free flame-retardant resin composition including recycled PET and recycled PC and a product using the resin composition has an important meaning in terms of environmental protection and practical application.

BRIEF SUMMARY OF THE INVENTION

The present invention is made in view of the circumstances, and objects of the present invention include providing a halogen-free flame-retardant resin composition including recycled polycarbonate and recycled polyethylene terephthalate and a copier/printer exterior part using the resin composition, each of which can realize cycle use (recycling) of polycarbonate and polyethylene terephthalate, and prevent stability of mechanical performance of materials (components) of the resin composition from decreasing.

In order to achieve at least one of the objects, according to an aspect of the present invention, there is provided a copier/printer exterior part using a halogen-free flame-retardant resin composition including: 5 wt % to 50 wt % of unused polycarbonate; 20 wt % to 63 wt % of recycled polycarbonate; 5 wt % to 35 wt % of recycled polyethylene terephthalate; 0.2 wt % to 2 wt % of a styrene-acrylonitrile-glycidyl methacrylate terpolymer; 5 wt % to 15 wt % of a toughener; 10 wt % to 20 wt % of a flame retardant; 0.1 wt % to 0.8 wt % of a flame-retardant antidrip agent; 0.1 wt % to 1 wt % of an antioxidant; and 0.1 wt % to 2 wt % of a lubricant, wherein the styrene-acrylonitrile-glycidyl methacrylate terpolymer includes 1 wt % to 5 wt % of glycidyl methacrylate and 20 wt % to 33 wt % of acrylonitrile.

BRIEF DESCRIPTION OF THE SEVERAL VIEWS OF THE DRAWING

The present invention is fully understood from the detailed description given hereinafter and the accompanying drawings, which are given by way of illustration only, and thus are not intended to limit the present invention, wherein.

DETAILED DESCRIPTION OF THE INVENTION

In the following, the present invention is described in detail by using examples. The examples are given for a person skilled in the art only to more easily understand the present invention. Hence the present invention is not limited to the example, and can be variously modified without departing from the scope of the present invention.

Figure 1:
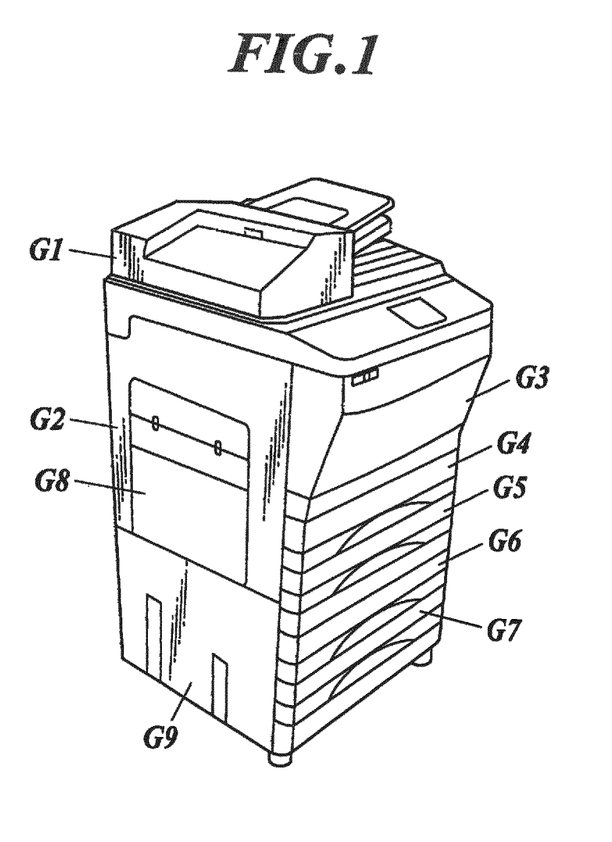
FIG. 1 shows external appearance of a copier using an exterior part in accordance with an example of the present invention.
Figure 2:
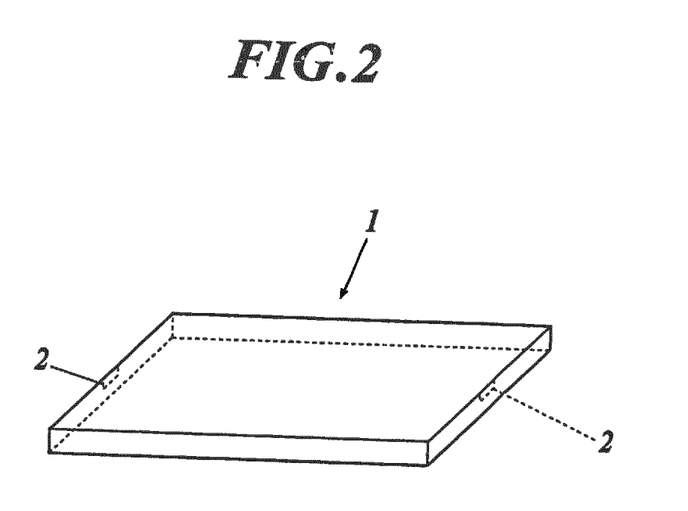
FIG. 2 is a perspective view of the exterior part (outside dimensions: length of 500 mm, width of 600 mm, and thickness of 2.5 mm) using a resin composition in accordance with an example of the present invention.

An exterior part for a copier or a printer (a copier/printer exterior part 1 shown in FIG. 2) of the present invention is used in a scanner which reads an original document, a copier which prints the original document read by the scanner, a printer or a facsimile apparatus which prints image data inputted from an external apparatus, or a multifunctional machine called MFP (Multi Function Peripheral) which has these functions. The copier/printer exterior part 1 of the present invention is used for exterior parts G1 to G9 of a copier shown in FIG. 1, for example. The copier/printer exterior part 1 is provided with pin side gates 2 as shown in FIG. 2.

In the following, an "unused" component indicates that the component has not been used yet, and a "recycled" component indicates that the component has been used before. That is, for example, "unused polycarbonate (PC)" indicates that the PC has not been used, and "recycled polycarbonate (PC)" indicates that the PC has been used before. These are well known by a person skilled in the art.

1. Examples 1 to 10 and Comparative Examples 1 to 16

1.1 Explanation of Components

Component A-1: unused PC having a weight average molecular weight of 25000, produced by HONAM Petrochemical Corp.

Component A-2: unused PC having a weight average molecular weight of 21000, produced by HONAM Petrochemical Corp.

Component A-3: recycled PC having a weight average molecular weight of 24000, on the market Component B-1: recycled PET derived from PET bottles/sheets for drinks, and having a viscosity of 0.8 dl/g, on the market Component B-2: unused PET having a viscosity of 1.0 dl/g, produced by Jinshan Petrochemical Company Component C-1: styrene-acrylonitrile-glycidyl methacrylate terpolymer containing 8 wt % glycidyl methacrylate and 28 wt % acrylonitrile Component C-2: styrene-acrylonitrile-glycidyl methacrylate terpolymer containing 5 wt % glycidyl methacrylate and 28 wt % acrylonitrile Component C-3: styrene-acrylonitrile-glycidyl methacrylate terpolymer containing 2 wt % glycidyl methacrylate and 28 wt % acrylonitrile Component C-3a: styrene-acrylonitrile-glycidyl methacrylate terpolymer containing 2 wt % glycidyl methacrylate and 35 wt % acrylonitrile Component C-3b: styrene-acrylonitrile-glycidyl methacrylate terpolymer containing 2 wt % glycidyl methacrylate and 30 wt % acrylonitrile Component C-3c: styrene-acrylonitrile-glycidyl methacrylate terpolymer containing 2 wt % glycidyl methacrylate and 27 wt % acrylonitrile Component C-3d: styrene-acrylonitrile-glycidyl methacrylate terpolymer containing 2 wt % glycidyl methacrylate and 20 wt % acrylonitrile Component C-3e: styrene-acrylonitrile-glycidyl methacrylate terpolymer containing 2 wt % glycidyl methacrylate and 15 wt % acrylonitrile Component C-4: styrene-acrylonitrile-glycidyl methacrylate terpolymer containing 1 wt % glycidyl methacrylate and 28 wt % acrylonitrile Component C-5: styrene-acrylonitrile-glycidyl methacrylate terpolymer containing 0.5 wt % glycidyl methacrylate and 28 wt % acrylonitrile Component D-1: MBS EM-500, produced by LG Electronics Component D-2: acrylic acid-silicone rubber system toughener, S-2001, produced by Mitsubishi Rayon Co., Ltd.

Component D-3: acrylonitrile-butadiene-styrene copolymer toughener containing 54 wt % butadiene, 34 wt % styrene and 12 wt % acrylonitrile, produced by Korea Kumho Petrochemical Co., Ltd.

Component E: flame retardant, BDP, produced by Great Lakes Chemical Corporation

Component F: flame-retardant antidrip agent, AS-coated polytetrafluoroethylene system flame-retardant antidrip agent containing 50 wt % polytetrafluoroethylene, on the market Component G: processing aid containing, for example, ethylenebisstearamide (lubricant), IRGAFOS® 168 (phosphite (phosphoric acid ester) system antioxidant), IRGANOX® 1076 (hindered phenol system antioxidant), and DOW CORNING® MB-50 (lubricant), and having a weight ratio of ethylenebisstearamide, IRGAFOS® 168, IRGANOX® 1076 and DOW CORNING® MB-50 being 2:2:1:1

1.2 Measuring Method of Mechanical Performance

Notched Izod Impact Strength: measured in accordance with ASTM-D256 standard

MI (Melt Index): measured in accordance with ASTM-D1238 standard

FR (Flame Resistance): measured in accordance with UL 94 standard 1.3 Preparation Method of Examples 1-10 and Comparative Examples 1-16

(1) Examples 1 to 10

Each of Examples 1 to 10 provided a halogen-free flame-retardant resin composition including recycled PC and recycled PET.

The preparation method of the halogen-free flame-retardant resin composition of each of Examples 1 to 10 included the following steps of:

a) obtaining materials of the halogen-free flame-retardant resin composition in accordance with the components and their contents (wt %) shown in TABLE 1;

b) of the materials obtained at Step (a), sufficiently mixing a recycled PET material and a styrene-acrylonitrile-glycidyl methacrylate terpolymer material in a mixer so as to make a first mixture, taking out the first mixture from the mixer, and placing the first mixture in a screw extruder to extrude the first mixture so as to produce a base grain (a first step in a two-step method as a processing method); and c) sufficiently mixing the base grain and the remaining materials in the mixer so as to make a second mixture, taking out the second mixture from the mixer, and placing the second mixture in the screw extruder to extrude the second mixture so as to produce a final grain as the halogen-free flame-retardant resin composition (pellet) (a second step in the two-step method as the processing method).

The mechanical performance of each obtained pellet was examined. The result is shown in TABLE 1.

(2) Comparative Examples 1, 2, 8 and 9

Each of Comparative Examples 1, 2, 8 and 9 provided a halogen-free flame-retardant resin composition including recycled PC and recycled PET.

The preparation method of the halogen-free flame-retardant resin composition of each of Comparative Examples 1, 2, 8 and 9 included the following steps of:

a) obtaining materials of the halogen-free flame-retardant resin composition in accordance with the components and their contents (wt %) shown in TABLE 2; and b) sufficiently mixing the materials in a mixer so as to make a mixture, taking out the mixture from the mixer, and placing the mixture in a screw extruder to extrude the mixture so as to produce a grain as the halogen-free flame-retardant resin composition (pellet) (a one-step method as the processing method).

The mechanical performance of each obtained pellet was examined. The result is shown in TABLE 2.

(3) Comparative Examples 3 to 7 and 10

Each of Comparative Examples 3 to 7 and 10 provided a halogen-free flame-retardant resin composition including recycled PC and recycled PET.

The preparation method of the halogen-free flame-retardant resin composition of each of Comparative Examples 3 to 7 and 10 included the following steps of:

a) obtaining materials of the halogen-free flame-retardant resin composition in accordance with the components and their contents (wt %) shown in TABLE 2;

b) of the materials obtained at Step (a), sufficiently mixing a recycled PET material and a styrene-acrylonitrile-glycidyl methacrylate terpolymer material in a mixer so as to make a first mixture, taking out the first mixture from the mixer, and placing the first mixture in a screw extruder to extrude the first mixture so as to produce a base grain (the first step in the two-step method as the processing method); and c) sufficiently mixing the base grain and the remaining materials in the mixer so as to make a second mixture, taking out the second mixture from the mixer, and placing the second mixture in the screw extruder to extrude the second mixture so as to produce a final grain as the halogen-free flame-retardant resin composition (pellet) (the second step in the two-step method as the processing method).

The mechanical performance of each obtained pellet was examined. The result is shown in TABLE 2.

(4) Comparative Examples 11 to 16

Each of Comparative Examples 11 to 16 provided a halogen-free flame-retardant resin composition including recycled PC and recycled PET.

The preparation method of the halogen-free flame-retardant resin composition of each of Comparative Examples 11 to 16 included the following steps of:

a) obtaining materials of the halogen-free flame-retardant resin composition in accordance with the components and their contents (wt %) shown in TABLE 3;

b) of the materials obtained at Step (a), sufficiently mixing a recycled PET material and a styrene-acrylonitrile-glycidyl methacrylate terpolymer material in a mixer so as to make a first mixture, taking out the first mixture from the mixer, and placing the first mixture in a screw extruder to extrude the first mixture so as to produce a base grain (the first step in the two-step method as the processing method); and c) sufficiently mixing the base grain and the remaining materials in the mixer so as to make a second mixture, taking out the second mixture from the mixer, and placing the second mixture in the screw extruder to extrude the second mixture so as to produce a final grain as the halogen-free flame-retardant resin composition (pellet) (the second step in the two-step method as the processing method).

The mechanical performance of each obtained pellet was examined. The result is shown in TABLE 3.

1.4 Conclusion Obtained from Examples 1 to 10 and Comparative Examples 1 to 16

1.4.1 It is preferable that the styrene-acrylonitrile-glycidyl methacrylate terpolymer contain 1 wt % to 5 wt % glycidyl methacrylate and 27 wt % to 30 wt % acrylonitrile.

(1) When Example 1 was compared with Comparative Examples 3 and 4, as shown in TABLE 1 and TABLE 2, the notched Izod impact strength ("impact strength" hereinafter) of Comparative Examples 3 and 4 was significantly lower than that of Example 1. The difference between Example 1 and Comparative Examples 3 and 4 was the component C. That is, Example 1, Comparative Example 3 and Comparative Example 4 used the components C-3, C-1 and C-5, respectively. Each of the components C-3, C-1 and C-5 was a styrene-acrylonitrile-glycidyl methacrylate terpolymer containing 28 wt % acrylonitrile. However, the components C-3 (Example 1), C-1 (Comparative Example 3) and C-5 (Comparative Example 4) contained 2 wt %, 5 wt % and 0.5 wt % glycidyl methacrylate, respectively. Therefore, it is indicated that the halogen-free flame-retardant resin composition which contains the styrene-acrylonitrile-glycidyl methacrylate terpolymer containing 2 wt % glycidyl methacrylate is excellent in mechanical performance.

(2) When Example 1 was compared with Examples 5 and 6, as shown in TABLE 1, the impact strength of Examples 1, 5 and 6 was high. Examples 1, 5 and 6 used the components C-3, C-2 and C-4, respectively. Each of the components C-3, C-2 and C-4 was a styrene-acrylonitrile-glycidyl methacrylate terpolymer containing 28 wt % acrylonitrile. However, the components C-3 (Example 1), C-2 (Example 5) and C-4 (Example 6) contained 2 wt %, 5 wt % and 1 wt % glycidyl methacrylate, respectively. Therefore, it is preferable that the component, namely, the styrene-acrylonitrile-glycidyl methacrylate terpolymer, contain 1 wt % to 5 wt % glycidyl methacrylate.

(3) When Example 1 was compared with Comparative Examples 11, 12, 13, 14 and 15, as shown in TABLE 1 and TABLE 3, the impact strength of Example 1 was high, and the impact strength of Comparative Examples 12 and 13 was relatively high too. The difference between Example 1 and Comparative Examples 11, 12, 13, 14 and 15 was the content (wt %) of acrylonitrile in the styrene-acrylonitrile-glycidyl methacrylate terpolymer (component C-3, C-3a, C-3b, C-3c, C-3d or C-3e). The contents of acrylonitrile of the components C-3 (Example 1), C-3a (Comparative Example 11), C-3b (Comparative Example 12), C-3c (Comparative Example 13), C-3d (Comparative Example 14) and C-3e (Comparative Example 15) were 28 wt %, 35 wt %, 30 wt %, 27 wt %, 20 wt % and 15 wt %, respectively. Therefore, it is preferable that the component, namely, the styrene-acrylonitrile-glycidyl methacrylate terpolymer, contain 27 wt % to 30 wt % acrylonitrile.

In conclusion, when a styrene-acrylonitrile-glycidyl methacrylate terpolymer is used in the halogen-free flame-retardant resin composition, it is preferable that the terpolymer contain 1 wt % to 5 wt % glycidyl methacrylate and 27 wt % to 30 wt % acrylonitrile.

1.4.2 It is preferable that the halogen-free flame-retardant resin composition contain 0.2 wt % to 2 wt % styrene-acrylonitrile-glycidyl methacrylate terpolymer.

When Examples 1, 7 and 8 were compared with each other, as shown in TABLE 1, "Example 8>Example 1>Example 7" was true in impact strength.

The difference between Examples 1, 7 and 8 was the content of the component C-3. The contents of the component C-3 of Examples 1, 7 and 8 were 0.4 wt %, 0.2 wt % and 2 wt %, respectively.

When Comparative Examples 6 and 7 were compared with each other, as shown in TABLE 2, the impact strength of Comparative Example 6 was significantly lower than that of Comparative Example 7. When Comparative Example 7 and Example 8 were compared with each other, as shown in TABLE 2 and TABLE 1, the impact strength of Comparative Example 7 was almost the same as that of Example 8. However, the melt index of Comparative Example 7 was lower than that of Example 8. That is, the melt index decreased as the content of the styrene-acrylonitrile-glycidyl methacrylate terpolymer increased.

Furthermore, when Comparative Examples 1 and 2 were compared with each other, as shown in TABLE 2, "Comparative Example 2>Comparative Example 1" was true in impact strength. This indicates that the styrene-acrylonitrile-glycidyl methacrylate terpolymer is very important in the halogen-free flame-retardant resin composition, and can ensure impact strength to some extent. In addition, when the content of the styrene-acrylonitrile-glycidyl methacrylate terpolymer was less than 0.2 wt %, the styrene-acrylonitrile-glycidyl methacrylate terpolymer did not exert the favorable influence on the impact strength much. On the other hand, when the content thereof was more than 2 wt %, the impact strength did not improve any more, but the liquidity still decreased.

In conclusion, it is preferable that the halogen-free flame-retardant resin composition contain 0.2 wt % to 2 wt % styrene-acrylonitrile-glycidyl methacrylate terpolymer.

1.4.3 It is preferable that the halogen-free flame-retardant resin composition is prepared by using the two-step method as the processing method.

When Examples 1, 9 and 10 were compared with Comparative Examples 1, 8 and 9, as shown in TABLE 1 and TABLE 2, the impact strength of Examples 1, 9 and 10 was higher than that of Comparative Examples 1, 8 and 9. This is because, as the processing method, Examples 1, 9 and 10 used the two-step method while Comparative Examples 1, 8 and 9 used the one-step method. This indicates that the composition prepared by using the two-step method as the processing method is excellent in impact strength, and indicates that it is important to increase the viscosity of recycled PET in advance in order to stabilize physical property thereof.

1.4.4 It is preferable that the halogen-free flame-retardant resin composition contains less than 30 wt % recycled PET.

When Examples 1, 9 and 10 were compared with Comparative Examples 1, 8, and 9, as shown in TABLE 1 and TABLE 2, the higher the content of recycled PET was, the lower the impact strength was. In addition, when the content of recycled PET was 30 wt % (or more), the flame resistance became poor.

Furthermore, when Example 10 was compared with Comparative Example 10, as shown in TABLE 1 and TABLE 2, the impact strength of Comparative Example 10 was significantly lower than that of Example 10. The difference between Example 10 and Comparative Example 10 was the content of recycled PET. This indicates that, if the halogen-free flame-retardant resin composition contains more than 30 wt % recycled PET, the impact strength significantly decreases, and may exert a bad influence on the composition in terms of practical application.

In conclusion, it is preferable that, in terms of impact strength and flame resistance, the halogen-free flame-retardant resin composition contain less than 30 wt % recycled PET.

1.4.5 The styrene-acrylonitrile-glycidyl methacrylate terpolymer is effective not only in increasing the viscosity of PET (recycled PET), but also in preventing ester interchange of the PET, by blocking the ends of the PET.

When Example 1 was compared with Comparative Example 16, as shown in TABLE 1 and TABLE 3, "Example 1>Comparative Example 16" was true in impact strength. The difference between Example 1 and Comparative Example 16 was PET. Example 1 used recycled PET, and the recycled PET had been processed by the component C-3, while Comparative Example 16 used unused PET having a high viscosity. This indicates that even if unused PET is used as PET in the halogen-free flame-retardant resin composition, physical property of the PET (the composite, by extension) varies, and indicates that the styrene-acrylonitrile-glycidyl methacrylate terpolymer is effective not only in increasing the viscosity of PET (recycled PET), but also in preventing ester interchange of the PET, by blocking the ends of the PET.

1.4.6 Influence of the content of recycled PC on the impact strength can be controlled.

When Example 1 was compared with Example 4, as shown in TABLE 1, the impact strength of Example 1 was almost the same as that of Example 4. This indicates that the influence of the content of recycled PC on the impact strength can be controlled.

1.4.7 The core-shell structured acrylate (acrylic ester) system toughener and the core-shell structured acrylate (acrylic ester)-silicone rubber system toughener are relatively effective in toughening the halogen-free flame-retardant resin composition.

When Examples 1, 2 and 3 were compared with each other, as shown in TABLE 1, the impact strength thereof was almost the same. The difference between Examples 1, 2 and 3 was the toughener. Examples 1, 2 and 3 used, as the toughener, the components D1, D2 and D3, which is a mixture of the components D1 and D2, respectively. This indicates that both the core-shell structured acrylate system toughener and the core-shell structured acrylate-silicone rubber system toughener are relatively effective in toughening the composition.

TABLE 1-1

| EXAMPLE | EXAMPLE 1 | EXAMPLE 2 | EXAMPLE 3 | EXAMPLE 4 | EXAMPLE 5 |
|---|---|---|---|---|---|
| COMPONENT A-1 | 16 | 16 | 16 | 3 | 16 |
| COMPONENT A-2 | 16.5 | 16.5 | 16.5 | 3.5 | 16.5 |
| COMPONENT A-3 | 32.5 | 32.5 | 32.5 | 58.5 | 32.5 |
| COMPONENT B-1 | 10 | 10 | 10 | 10 | 10 |

TABLE 1-1-continued

| EXAMPLE | EXAMPLE 1 | EXAMPLE 2 | EXAMPLE 3 | EXAMPLE 4 | EXAMPLE 5 |
|---|---|---|---|---|---|
| COMPONENT B-2 | | | | | |
| COMPONENT C-1 | | | | | |
| COMPONENT C-2 | | | | | 0.4 |
| COMPONENT C-3 | 0.4 | 0.4 | 0.4 | 0.4 | |
| COMPONENT C-4 | | | | | |
| COMPONENT C-5 | | | | | |
| COMPONENT D-1 | 8.9 | | 5 | 8.9 | 8.9 |
| COMPONENT D-2 | | 8.9 | | | |
| COMPONENT D-3 | | | 3.9 | | |

| EXAMPLE | EXAMPLE 6 | EXAMPLE 7 | EXAMPLE 8 | EXAMPLE 9 | EXAMPLE 10 |
|---|---|---|---|---|---|
| COMPONENT A-1 | 16 | 16 | 15 | 12.4 | 10 |
| COMPONENT A-2 | 16.5 | 16.5 | 15.9 | 13 | 10.2 |
| COMPONENT A-3 | 32.5 | 32.5 | 32.5 | 25.4 | 20.2 |
| COMPONENT B-1 | 10 | 10 | 10 | 20 | 30 |
| COMPONENT B-2 | | | | | |
| COMPONENT C-1 | | | | | |
| COMPONENT C-2 | | | | | |
| COMPONENT C-3 | | 0.2 | 2 | 1 | 1.4 |
| COMPONENT C-4 | 0.4 | | | | |
| COMPONENT C-5 | | | | | |
| COMPONENT D-1 | 8.9 | 9.1 | 8.9 | 11.9 | 14.8 |
| COMPONENT D-2 | | | | | |
| COMPONENT D-3 | | | | | |

TABLE 1-2

| EXAMPLE | EXAMPLE 1 | EXAMPLE 2 | EXAMPLE 3 | EXAMPLE 4 | EXAMPLE 5 |
|---|---|---|---|---|---|
| COMPONENT E | 14.4 | 14.4 | 14.4 | 14.4 | 14.4 |
| COMPONENT F | 0.3 | 0.3 | 0.3 | 0.3 | 0.3 |
| COMPONENT G | 1 | 1 | 1 | 1 | 1 |
| PROCESSING METHOD | TWO-STEP METHOD | TWO-STEP METHOD | TWO-STEP METHOD | TWO-STEP METHOD | TWO-STEP METHOD |
| NOTCHED IZOD IMPACT STRENGTH [J/m], | 532.6 | 541.6 | 489.3 | 527.9 | 542.1 |
| MI [g/10min], 265° C. × 2.16 mg | 27.5 | 28.2 | 27.5 | 28.6 | 27.8 |
| FR, 1/16 in | V0 | V0 | V0 | V0 | V0 |

| EXAMPLE | EXAMPLE 6 | EXAMPLE 7 | EXAMPLE 8 | EXAMPLE 9 | EXAMPLE 10 |
|---|---|---|---|---|---|
| COMPONENT E | 14.4 | 14.4 | 14.4 | 14.9 | 12.4 |
| COMPONENT F | 0.3 | 0.3 | 0.3 | 0.4 | |

TABLE 1-2-continued

| COMPONENT G | 1 | 1 | 1 | 1 | 1 |
|---|---|---|---|---|---|
| PROCESSING METHOD | TWO-STEP METHOD | TWO-STEP METHOD | TWO-STEP METHOD | TWO-STEP METHOD | TWO-STEP METHOD |
| NOTCHED IZOD IMPACT STRENGTH [J/m], | 562.3 | 356.5 | 554.4 | 455.7 | 334.7 |
| MI [g/10 min], 265° C. × 2.16 kg | 27.2 | 28.2 | 25.2 | 35.2 | 41.3 |
| FR, 1/16 in | V0 | V0 | V0 | V0 | V2 |

TABLE 2-1

| COMPARATIVE EXAMPLE | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|
| COMPONENT A-1 | 16 | 16 | 16 | 16 | 32.5 |
| COMPONENT A-2 | 16.7 | 16.5 | 16.5 | 16.5 | 32.5 |
| COMPONENT A-3 | 32.7 | 32.5 | 32.5 | 32.5 | |
| COMPONENT B-1 | 10 | 10 | 10 | 10 | 10 |
| COMPONENT B-2 | | | | | |
| COMPONENT C-1 | | | | 0.4 | |
| COMPONENT C-2 | | | | | |
| COMPONENT C-3 | | 0.4 | | | 0.4 |
| COMPONENT C-4 | | | | | |
| COMPONENT C-5 | | | | | |
| COMPONENT D-1 | 8.9 | 8.9 | 8.9 | 8.9 | 8.9 |
| COMPONENT D-2 | | | | | |
| COMPONENT D-3 | | | | | |

| COMPARATIVE EXAMPLE | COMPARATIVE EXAMPLE 6 | COMPARATIVE EXAMPLE 7 | COMPARATIVE EXAMPLE 8 | COMPARATIVE EXAMPLE 9 | COMPARATIVE EXAMPLE 10 |
|---|---|---|---|---|---|
| COMPONENT A-1 | 16 | 15 | 12.4 | 10 | 8.6 |
| COMPONENT A-2 | 16.5 | 15.7 | 13 | 10.2 | 9 |
| COMPONENT A-3 | 32.5 | 32.5 | 25.4 | 20.2 | 17.6 |
| COMPONENT B-1 | 10 | 10 | 20 | 30 | 33 |
| COMPONENT B-2 | | | | | |
| COMPONENT C-1 | | | | | |
| COMPONENT C-2 | | | | | |
| COMPONENT C-3 | 0.1 | 2.2 | 1 | 1.4 | 1.6 |
| COMPONENT C-4 | | | | | |
| COMPONENT C-5 | | | | | |
| COMPONENT D-1 | 9.2 | 8.9 | 11.9 | 14.8 | 16.8 |
| COMPONENT D-2 | | | | | |
| COMPONENT D-3 | | | | | |

TABLE 2-2

| COMPARATIVE EXAMPLE | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|
| COMPONENT E | 14.4 | 14.1 | 14.4 | 14.4 | 14.4 |
| COMPONENT F | 0.3 | 0.3 | 0.3 | 0.3 | 0.3 |
| COMPONENT G | 1 | 1 | 1 | 1 | 1 |
| PROCESSING METHOD | ONE-STEP METHOD | ONE-STEP METHOD | TWO-STEP METHOD | TWO-STEP METHOD | TWO-STEP METHOD |
| NOTCHED IZOD IMPACT STRENGTH [J/m], 1/8 in | 138.7 | 258.7 | 182.5 | 212.3 | 572.6 |
| MI [g/10 min], 265° C. × 2.16 kg | 30.6 | 25.6 | 28.5 | 28.9 | 27.8 |
| FR, 1/16 in | V0 | V0 | V0 | V0 | V0 |

| COMPARATIVE EXAMPLE | COMPARATIVE EXAMPLE 6 | COMPARATIVE EXAMPLE 7 | COMPARATIVE EXAMPLE 8 | COMPARATIVE EXAMPLE 9 | COMPARATIVE EXAMPLE 10 |
|---|---|---|---|---|---|
| COMPONENT E | 14.4 | 14.4 | 14.9 | 12.4 | 12.4 |
| COMPONENT F | 0.3 | 0.3 | 0.4 | | |
| COMPONENT G | 1 | 1 | 1 | 1 | 1 |
| PROCESSING METHOD | TWO-STEP METHOD | TWO-STEP METHOD | ONE-STEP METHOD | ONE-STEP METHOD | ONE-STEP METHOD |
| NOTCHED IZOD IMPACT STRENGTH [J/m], 1/8 in | 152.1 | 532.1 | 95.6 | 78.6 | 119.3 |
| MI [g/10 min], 265° C. × 2.16 kg | 30.9 | 24.9 | 35.6 | 39.3 | 43.2 |
| FR, 1/16 in | V0 | V0 | V0 | V2 | V2 |

TABLE 3

| COMPARATIVE EXAMPLE | COMPARATIVE EXAMPLE 11 | COMPARATIVE EXAMPLE 12 | COMPARATIVE EXAMPLE 13 | COMPARATIVE EXAMPLE 14 | COMPARATIVE EXAMPLE 15 | COMPARATIVE EXAMPLE 16 |
|---|---|---|---|---|---|---|
| COMPONENT A-1 | 16 | 16 | 16 | 16 | 16 | 16 |
| COMPONENT A-2 | 16.5 | 16.5 | 16.5 | 16.5 | 16.5 | 16.5 |
| COMPONENT A-3 | 32.5 | 32.5 | 32.5 | 32.5 | 32.5 | 32.5 |
| COMPONENT B-1 | 10 | 10 | 10 | 10 | 10 | |
| COMPONENT B-2 | | | | | | 10 |
| COMPONENT C-1 | | | 0.4 | | | |
| COMPONENT C-3a | 0.4 | | | | | |
| COMPONENT C-3b | | 0.4 | | | | |
| COMPONENT C-3c | | | 0.4 | | | |
| COMPONENT C-3d | | | | 0.4 | | |
| COMPONENT C-3e | | | | | 0.4 | |
| COMPONENT D-1 | 8.9 | 8.9 | 8.9 | 8.9 | 8.9 | 9.3 |
| COMPONENT E | 14.4 | 14.4 | 14.4 | 14.4 | 14.4 | 14.4 |
| COMPONENT F | 0.3 | 0.3 | 0.3 | 0.3 | 0.3 | 0.3 |
| COMPONENT G | 1 | 1 | 1 | 1 | 1 | 1 |
| PROCESSING METHOD | TWO-STEP METHOD | TWO-STEP METHOD | TWO-STEP METHOD | TWO-STEP METHOD | TWO-STEP METHOD | TWO-STEP METHOD |
| NOTCHED IZOD IMPACT STRENGTH [J/m], 1/8 in | 334.2 | 451.1 | 466.2 | 241.5 | 231.5 | 335.5 |
| MI [g/10 min], 265° C. × 2.16 kg | 26.8 | 27.2 | 28.1 | 28.5 | 28.9 | 26.5 |
| FR, 1/16 in | V0 | V0 | V0 | V0 | V0 | V0 |

2. Examples 11 to 14

2.1 Explanation of Components

Component A-1a: Unused PC, bisphenol A type aromatic polycarbonate having a weight average molecular weight of 10000

Component A-2a: Unused PC, bisphenol A type aromatic polycarbonate having a weight average molecular weight of 40000

Component A-3a: Recycled PC, bisphenol A type aromatic polycarbonate having a weight average molecular weight of 10000

Component A-3b: Recycled PC, bisphenol A type aromatic polycarbonate having a weight average molecular weight of 40000

Component B-1a: Recycled PET having a viscosity of 0.65 dl/g, on the market

Component B-1b: Recycled PET having a viscosity of 0.90 dl/g, on the market

Component C-6: styrene-acrylonitrile-glycidyl methacrylate terpolymer containing 2 wt % glycidyl methacrylate and 33 wt % acrylonitrile, produced in-house Component C-7: styrene-acrylonitrile-glycidyl methacrylate terpolymer containing 3 wt % glycidyl methacrylate and 20 wt % acrylonitrile, produced in-house Component D-4: ethylene-methyl acrylate copolymer and ethylene-methyl acrylate-glycidyl methacrylate copolymer having a weight ratio of ethylene-methyl acrylate copolymer to ethylene-methyl acrylate-glycidyl methacrylate copolymer being 1:1

Component D-5: methyl methacrylate-silicone rubber copolymer and acrylonitrile-butadiene-acrylic ester copolymer having a weight ratio of methyl methacrylate-silicone rubber copolymer to acrylonitrile-butadiene-acrylate copolymer being 1:1

Component E-1: resorcinol bis(diphenyl phosphate)

Component E-2: trimethyl phosphate and diphenyl pentaerythritol diphosphate having a weight ratio of trimethylphosphate to diphenyl pentaerythritol diphosphate being 1:1.

Component F: flame-retardant antidrip agent, AS-coated polytetrafluoroethylene system flame-retardant antidrip agent containing 50 wt % polytetrafluoroethylene, on the market Component G-1a: antioxidant, bis(2,4-di-tert-butylphenyl) pentaerythritol diphosphite Component G-1b: antioxidant, pentaerythritol tetrakis(3-(3,5-di-tert-butyl-4-hydroxyphenyl)propionate) and tris(2,4-di-tert-butylphenyl) phosphite having a weight ratio of pentaerythritol tetrakis(3-(3,5-di-tert-butyl-4-hydroxyphenyl) propionate) to tris(2,4-ditert-butylphenyl) phosphite being 1:1

Component G-2a: lubricant, methylenebisstearic acid amide

Component G-2b: lubricant, zinc stearate and silane polymer

2:2 Measuring Method of Mechanical Performance

Notched Izod Impact Strength: measured in accordance with ASTM-D256 standard

MI (Melt Index): measured in accordance with ASTM-D1238 standard

FR (Flame Resistance): measured in accordance with UL 94 standard 2.3 Preparation Method of Examples 11 to 14

Each of Examples 11 to 14 provided a halogen-free flame-retardant resin composition including recycled PC and recycled PET.

The preparation method of the halogen-free flame-retardant resin composition of each of Examples 11 to 14 included the following steps of:

a) obtaining materials of the halogen-free flame-retardant resin composition in accordance with the components and their contents (wt %) shown in TABLE 4;

b) of the materials, sufficiently mixing a recycled polyethylene terephthalate material and a styrene-acrylonitrile-glycidyl methacrylate terpolymer material in a mixer so as to make a first mixture, taking out the first mixture from the mixer, and placing the first mixture in a screw extruder to extrude the first mixture so as to produce a base grain (the first step in the two-step method as the processing method); and c) sufficiently mixing the base grain and the remaining materials in the mixer so as to make a second mixture, taking out the second mixture from the mixer, and placing the second mixture in the screw extruder to extrude the second mixture so as to produce a final grain as the halogen-free flame-retardant resin composition (pellet) (the second step in the two-step method as the processing method).

The mechanical performance of each obtained pellet was examined. The result is shown in TABLE 4.

2.4 Conclusion obtained from Examples 11 to 14

As shown in TABLE 4, the halogen-free flame-retardant resin compositions, each of which included recycled PC and recycled PET, prepared as Examples 11 to 14 were, overall, excellent in impact strength and the like, and also excellent in stability of the impact strength (mechanical performance).

TABLE 4

| Example | Example 11 | Example 12 | Example 13 | Example 14 |
|---|---|---|---|---|
| UNUSED PC | A-1a, 5 | A-2a, 50 | A-1a, 13 | A-2a, 25 |
| RECYCLED PC | A-3a, 63 | A-3b, 20 | A-3b, 20 | A-3a, 37 |
| RECYCLED PET | B-1a, 5 | B-1b, 7.5 | B-1b, 35 | B-1a, 15 |
| STYRENE-ACRYLONITRILE-GLYCIDYL METHACRYLATE TERPOLYMER | C-6, 1 | C-7, 0.5 | C-7, 1 | C-6, 1 |
| TOUGHENER | D-4, 15 | D-5, 5 | D-5, 8 | D-4, 8 |
| FLAME RETARDANT | E-1, 10 | E-2, 15 | E-2, 20 | E-1, 12 |
| FLAME-RETARDANT ANTIDRIP AGENT | F, 0.8 | F, 0.1 | F, 0.5 | F, 0.5 |
| ANTIOXIDANT | G-1a, 0.1 | G-1B, 1 | G-1B, 0.5 | G-1A, 0.5 |
| LUBRICANT | G-2a, 0.1 | G-2B, 0.9 | G-2B, 2 | G-2A, 1 |
| PROCESSING METHOD | TWO-STEP METHOD | TWO-STEP METHOD | TWO-STEP METHOD | TWO-STEP METHOD |
| NOTCHED IZOD IMPACT STRENGTH [J/m], 1/8 in | 289.3 | 614.3 | 112.1 | 346.5 |
| MI [g/10min], 265° C. × 2.16 kg | 23.9 | 19.3 | 46.5 | 35.5 |
| FR, 1/16 in | N/A | V0 | N/A | V2 |

As described above, in the present invention, recycled PET and a styrene-acrylonitrile-glycidyl methacrylate terpolymer (a first mixture) are extruded together to produce a base grain. Consequently, by glycidyl methacrylate, the viscosity of the recycled PET is increased, and the ends thereof are blocked. Accordingly, molecular weights thereof are increased, and distribution of the molecular weights becomes stable, so that ester interchange can be controlled. Accordingly, a halogen-free flame-retardant resin composition including recycled PC and recycled PET of the present invention is excellent in impact strength, has high stability of the impact stretch (mechanical performance), and reduces costs of a product to which the composition is applied.

3. Manufacturing of Exterior Part

Each of the obtained pellets (compositions) as Examples 1 to 14 and Comparative Examples 1 to 16 was dried for five hours at 100° C. with a hot-air circulation system dryer. After dried, the pellet was molded at a cylinder temperature of 250° C. and a die temperature of 80° C. by using an injection molding machine (J1300E-C5, produced by The Japan Steel Works, LTD.) to manufacture the copier/printer exterior part 1 shown in FIG. 2. Then, a sample was extracted from the center thereof. External appearance of each sample was evaluated. The result is shown in TABLE 5 and TABLE 6.

The evaluation on the external appearance of each sample, namely, each product (copier/printer exterior part 1), was evaluated by visually observing the external appearance of the sample. The criteria are as follows.

⊚ (double circle):
There is no problem or the external appearance.
○ (circle):
Burned spots and/or burrs are slightly seen, but they are not a problem as a product.
X (cross):
Burned spots and/or burrs are seen, and they are a problem as a product.

using a halogen-free flame-retardant resin composition including: 5 wt % to 50 wt % of unused polycarbonate; 20 wt % to 63 wt % of recycled polycarbonate; 5 wt % to 35 wt % of recycled polyethylene terephthalate; 0.2 wt % to 2 wt % of a styrene-acrylonitrile-glycidyl methacrylate terpolymer; 5 wt % to 15 wt % of a toughener; 10 wt % to 20 wt % of a flame retardant; 0.1 wt % to 0.8 wt % of a flame-retardant antidrip agent; 0.1 wt % to 1 wt % of an antioxidant; and 0.1 wt % to 2 wt % of a lubricant, wherein the styrene-acrylonitrile-glycidyl methacrylate terpolymer includes 1 wt % to 5 wt % of glycidyl methacrylate and 20 wt % to 33 wt % of acrylonitrile.

Preferably, in the copier/printer exterior part, the styrene-acrylonitrile-glycidyl methacrylate terpolymer includes 1 wt % to 5 wt % of glycidyl methacrylate and 27 wt % to 30 wt % of acrylonitrile.

Preferably, in the copier/printer exterior part, the unused polycarbonate is bisphenol A type aromatic polycarbonate having a weight average molecular weight of 10000 to 40000.

Preferably, in the copier/printer exterior part, the recycled polycarbonate is bisphenol A type aromatic polycarbonate having a weight average molecular weight of 10000 to 40000.

Preferably, in the copier/printer exterior part, the recycled polyethylene terephthalate has a viscosity of 0.65 dl/g to 0.9 dl/g.

TABLE 5

| EXAMPLE | EXAMPLE 1 | EXAMPLE 2 | EXAMPLE 3 | EXAMPLE 4 | EXAMPLE 5 | EXAMPLE 7 | EXAMPLE 8 |
|---|---|---|---|---|---|---|---|
| EXTERNAL APPEARANCE | ⊚ | ⊚ | ⊚ | ⊚ | ⊚ | ⊚ | ⊚ |

| EXAMPLE | EXAMPLE 9 | EXAMPLE 10 | EXAMPLE 11 | EXAMPLE 12 | EXAMPLE 13 | EXAMPLE 14 |
|---|---|---|---|---|---|---|
| EXTERNAL APPEARANCE | ○ | ⊚ | ⊚ | ⊚ | ⊚ | ⊚ |

TABLE 6

| COMPARATIVE EXAMPLE | COMPARATIVE EXAMPLE 1 | COMPARATIVE EXAMPLE 2 | COMPARATIVE EXAMPLE 3 | COMPARATIVE EXAMPLE 4 |
|---|---|---|---|---|
| EXTERNAL APPEARANCE | ○ | ○ | ○ | ○ |
| COMPARATIVE EXAMPLE | COMPARATIVE EXAMPLE 5 | COMPARATIVE EXAMPLE 6 | COMPARATIVE EXAMPLE 7 | COMPARATIVE EXAMPLE 8 |
| EXTERNAL APPEARANCE | ○ | ○ | × | ○ |
| COMPARATIVE EXAMPLE | COMPARATIVE EXAMPLE 9 | COMPARATIVE EXAMPLE 10 | COMPARATIVE EXAMPLE 11 | COMPARATIVE EXAMPLE 12 |
| EXTERNAL APPEARANCE | ○ | × | ○ | ○ |
| COMPARATIVE EXAMPLE | COMPARATIVE EXAMPLE 13 | COMPARATIVE EXAMPLE 14 | COMPARATIVE EXAMPLE 15 | COMPARATIVE EXAMPLE 16 |
| EXTERNAL APPEARANCE | ○ | ○ | ○ | ○ |

When Examples 1 to 14 were compared with Comparative Examples 1 to 16, as shown in TABLE 5 and TABLE 6, the copier/printer exterior parts 1 manufactured by using the compositions of Examples 1 to 14 were better in external appearance.

According to an aspect of the examples of the present invention, there is provided a copier/printer exterior part Preferably, in the copier/printer exterior part, the toughener is at least one of a core-shell structured acrylate system toughener, a core-shell structured acrylate-silicone rubber system toughener, a core-shell structured styrene system toughener, a long-chain type toughener, and a reaction type terpolymer toughener.

Preferably, in the copier/printer exterior part, the toughener is at least one of a core-shell structured acrylate system toughener and a core-shell structured acrylate-silicone rubber system toughener.

Preferably, in the copier/printer exterior part, the core-shell structured acrylate system toughener is a methyl methacrylate-butadiene-styrene copolymer, an acrylonitrile-butadiene-acrylate copolymer, or a methyl methacrylate-butyl methacrylate copolymer, the core-shell structured acrylate-silicone rubber system toughener is a methyl methacrylate-silicone rubber copolymer, the core-shell structured styrene system toughener is an acrylonitrile-styrene-butadiene terpolymer, the long chain type toughener is an ethylene-methyl acrylate copolymer or an ethylene-butyl acrylate copolymer, and the reaction type terpolymer toughener is an ethylene-methyl acrylate-glycidyl methacrylate copolymer or an ethylene-butyl acrylate-glycidyl methacrylate copolymer.

Preferably, in the copier/printer exterior part, the flame retardant is a phosphate type flame retardant.

Preferably, in the copier/printer exterior part, the phosphate type flame retardant is at least one of a monophosphate type flame retardant and an oligophosphate type flame retardant.

Preferably, in the copier/printer exterior part, the monophosphate type flame retardant is trimethyl phosphate, triethyl phosphate, triphenyl phosphate, dimethylphenyl phosphate, tributyl phosphate, or xylyl diphenyl phosphate, and the oligophosphate type flame retardant is resorcinol bis (diphenyl phosphate), bisphenol A bis (diphenyl phosphate), or diphenyl pentaerythritol diphosphate.

Preferably, in the copier/printer exterior part, the antioxidant is at least one of a hindered phenol system antioxidant and a phosphite system antioxidant.

Preferably, in the copier/printer exterior part, the hindered phenol system antioxidant is triethylene glycol bis[β-(3-tert-butyl-4-hydroxy-5-methylphenyl)propionate], pentaerythritol tetrakis[3-(3,5-di-tert-butyl-4-hydroxyphenyl)propionate], or n-octadecyl-β-(3,5- di-tert-butyl-4-hydroxyphenyl)propionate, and the phosphite system antioxidant is tris(2,4-di-tert-butylphenyl)phosphite or bis(2, 4-di-tert-butylphenyl)pentaerythritol diphosphite.

Preferably, in the copier/printer exterior part, the lubricant is at least one of fatty acid salt, fatty acid amide, a silane polymer, solid paraffin, liquid paraffin, calcium stearate, zinc stearate, octadecanamide, silicone powder, methylene bis(octadecanamide), and N,N'-ethylene bis(octadecanamide).

Preferably, in the copier/printer exterior part, the flame-retardant antidrip agent is a polytetrafluoroethylene system flame-retardant antidrip agent.

Preferably, in the copier/printer exterior part, the halogen-free flame-retardant resin composition is obtained by: obtaining materials of the halogen-free flame-retardant resin composition; of the materials, sufficiently mixing a recycled polyethylene terephthalate material and a styrene-acrylonitrile-glycidyl methacrylate terpolymer material in a mixer so as to make a first mixture, taking out the first mixture from the mixer, and placing the first mixture in a screw extruder to extrude the first mixture so as to produce a base grain; and sufficiently mixing the base grain and the remaining materials in the mixer so as to make a second mixture, taking out the second mixture from the mixer, and placing the second mixture in the screw extruder to extrude the second mixture so as to produce a final grain as the halogen-free flame-retardant resin composition.

According to the present invention, recycled PET and a styrene-acrylonitrile-glycidyl methacrylate terpolymer, namely, a first mixture, are extruded to produce a base grain. Consequently, by glycidyl methacrylate, the viscosity of the recycled PET is increased, and the ends thereof are blocked. Accordingly, molecular weights thereof are increased, and distribution of the molecular weights becomes stable, so that ester interchange can be controlled. Accordingly, a halogen-free flame-retardant resin composition including recycled PC and recycled PET of the present invention is excellent in impact strength, has high stability of the excellent impact strength (mechanical performance), and reduces costs of a product to which the composition is applied.

The halogen-free flame-retardant resin composition of the present invention can be applied, for example, to household electric appliance or office automation equipment, so that the halogen-free flame-retardant composition can replace a halogen-free frame-retardant polycarbonate/acrylonitrile-butadiene-styrene (PC/ABS) used in the household electric appliance or the office automation equipment.

This application is based upon and claims the benefit of priority under 35 USC 119 of Chinese Patent Application No. 201210016861.X filed Jan. 18, 2012, the entire disclosure of which, including the description, claims, drawings, and abstract, is incorporated herein by reference in its entirety.

What is claimed is:

1. A method for producing a copier/printer exterior part from a chlorine-free and bromine-free flame-retardant resin composition comprising:
   5 wt % to 50 wt % of unused polycarbonate;
   20 wt % to 63 wt % of recycled polycarbonate;
   5 wt % to 35 wt % of recycled polyethylene terephthalate;
   0.2 wt % to 2 wt % of a styrene-acrylonitrile-glycidyl methacrylate terpolymer; the styrene-acrylonitrile-glycidyl methacrylate terpolymer includes 1 wt. % to 5 wt. % of glycidyl methacrylate and 20 wt. % to 33 wt. % of acrylonitrile,
   5 wt % to 15 wt % of a toughener;
   10 wt % to 20 wt % of a flame retardant;
   0.1 wt % to 0.8 wt % of a flame-retardant antidrip agent;
   0.1 wt % to 1 wt % of an antioxidant; and
   0.1 wt % to 2 wt % of a lubricant,
   the method comprising
   obtaining materials of the resin composition;
   mixing the recycled polyethylene terephthalate material and the styrene-acrylonitrile-glycidyl methacrylate terpolymer material in a mixer so as to make a first mixture;
   extruding the first mixture in a screw extruder so as to produce a base grain;
   mixing the base grain and the remaining materials in a mixer so as to make a second mixture;
   extruding the second mixture in a screw extruder so as to produce a final grain as the chlorine free and bromine-free flame-retardant resin composition; and
   manufacturing the copier/printer exterior part from the final grain.

2. The method according to claim 1, wherein the styrene-acrylonitrile-glycidyl methacrylate terpolymer includes 1 wt % to 5 wt % of glycidyl methacrylate and 27 wt % to 30 wt % of acrylonitrile.

3. The method according to claim 1, wherein the unused polycarbonate is bisphenol A aromatic polycarbonate having a weight average molecular weight of 10000 to 40000.

4. The method according to claim 1, wherein the recycled polycarbonate is bisphenol A aromatic polycarbonate having a weight average molecular weight of 10000 to 40000.

5. The method according to claim 1, wherein the recycled polyethylene terephthalate has a viscosity of 0.65 dl/g to 0.9 dl/g.

6. The method according to claim 1, wherein the toughener is at least one of a core-shell structured acrylate system toughener, a core-shell structured acrylate silicone rubber system toughener, a core-shell structured styrene system toughener, a long-chain-containing toughener, and a reactive terpolymer toughener.

7. The method according to claim 6, wherein the toughener is at least one of a core-shell structured acrylate system toughener and a core-shell structured acrylate-silicone rubber system toughener.

8. The method according to claim 6, wherein the core-shell structured acrylate system toughener is a methyl methacrylate-butadiene-styrene copolymer, an acrylonitrile-butadiene-acrylate copolymer, or a methyl methacrylate-butyl methacrylate copolymer, the core-shell structured acrylate-silicone rubber system toughener is a methyl methacrylate-silicone rubber copolymer, the core-shell structured styrene system toughener is an acrylonitrile-styrene-butadiene terpolymer, the long-chain-containing toughener is an ethylene-methyl acrylate copolymer or an ethylene-butyl acrylate copolymer, and the reactive terpolymer toughener is an ethylene-methyl acrylate-glycidyl methacrylate copolymer or an ethylene-butyl acrylate-glycidyl methacrylate copolymer.

9. The method according to claim 1, wherein the flame retardant is a phosphate flame retardant.

10. The method according to claim 9, wherein the phosphate flame retardant is at least one of a monophosphate flame retardant and an oligophosphate flame retardant.

11. The method according to claim 10, wherein the monophosphate flame retardant is trimethyl phosphate, triethyl phosphate, triphenyl phosphate, dimethylphenyl phosphate, tributyl phosphate, or xylyl diphenyl phosphate, and the oligophosphate flame retardant is resorcinol bis (diphenyl phosphate), bisphenol A bis (diphenyl phosphate), or diphenyl pentaerythritol diphosphate.

12. The method according to claim 1, wherein the antioxidant is at least one of a hindered phenol system antioxidant and a phosphite system antioxidant.

13. The method according to claim 12, wherein the hindered phenol system antioxidant is triethylene glycol bis[β-(3-tert-butyl-4-hydroxy-5-methylphenyl) propionate], pentaerythritol tetrakis[3-(3,5-di-tert-butyl-4-hydroxyphenyl)propionate], or n-octadecyl-β-(3,5-di-tert-butyl-4-hydroxyphenyl)propionate, and the phosphite system antioxidant is tris(2,4-di-tert-butylphenyl)phosphite or bis(2,4-di-tert-butylphenyl) pentaerythritol diphosphite.

14. The method according to claim 1, wherein the lubricant is at least one of fatty acid salt, fatty acid amide, a silane polymer, solid paraffin, liquid paraffin, calcium stearate, zinc stearate, octadecanamide, silicone powder, methylene bis(octadecanamide), and N,N'-ethylene bis(octadecanamide).

15. The method according to copier/printer exterior part according to claim 1, wherein the flame-retardant antidrip agent is a polytetrafluoroethylene system flame-retardant antidrip agent.

16. The method according to claim 1, comprising:

20.2 wt. % to 32.5 wt. % of the unused polycarbonate, 20.2 wt. % to 32.5 wt. % of the recycled polycarbonate, 10 wt. % to 30 wt. % of the recycled polyethylene terephthalate, and 0.4 wt. % to 1.4 wt. % of the styrene-acrylonitrile-glycidyl methacrylate terpolymer.

* * * * *

UNITED STATES PATENT AND TRADEMARK OFFICE
CERTIFICATE OF CORRECTION

PATENT NO. : 8,865,795 B1  
APPLICATION NO. : 14/302633  
DATED : October 21, 2014  
INVENTOR(S) : Minqi Xin et al.

Page 1 of 1

It is certified that error appears in the above-identified patent and that said Letters Patent is hereby corrected as shown below:

On the title page item (73) should read,

Assignees:  Konica Minolta Business Technologies, Inc.  
Tokyo (JP);  
Shanghai Kumhosunny Plastic Co., Ltd.  
Shanghai (CN)

Signed and Sealed this  
Twelfth Day of January, 2016

Michelle K. Lee  
*Director of the United States Patent and Trademark Office*